Feb. 12, 1963 C. GOBEL ET AL 3,077,268
DIALYZER
Filed May 6, 1959 2 Sheets-Sheet 2
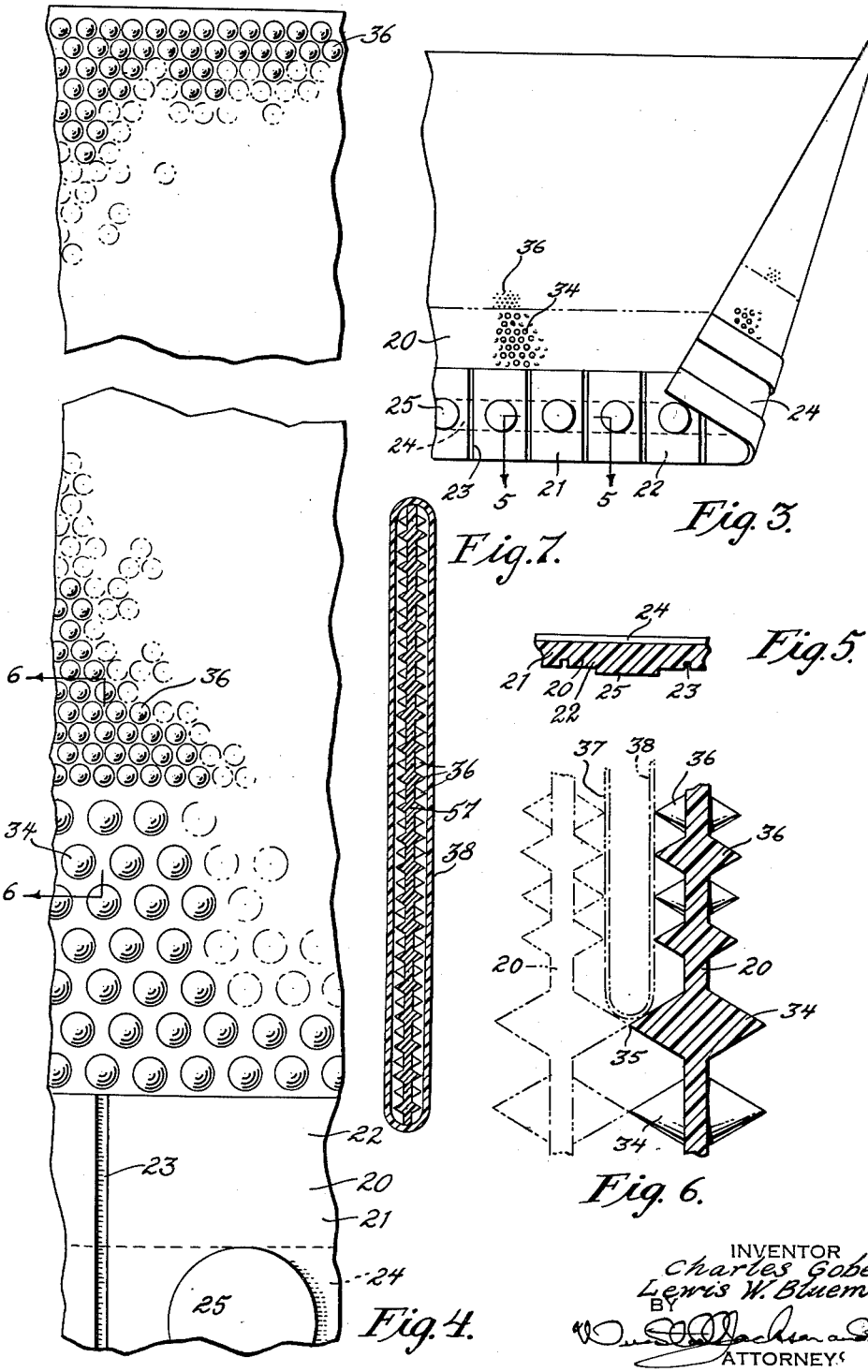
INVENTOR
Charles Gobel
Lewis W. Bluemle, Jr.
BY
ATTORNEYS

United States Patent Office 3,077,268
Patented Feb. 12, 1963

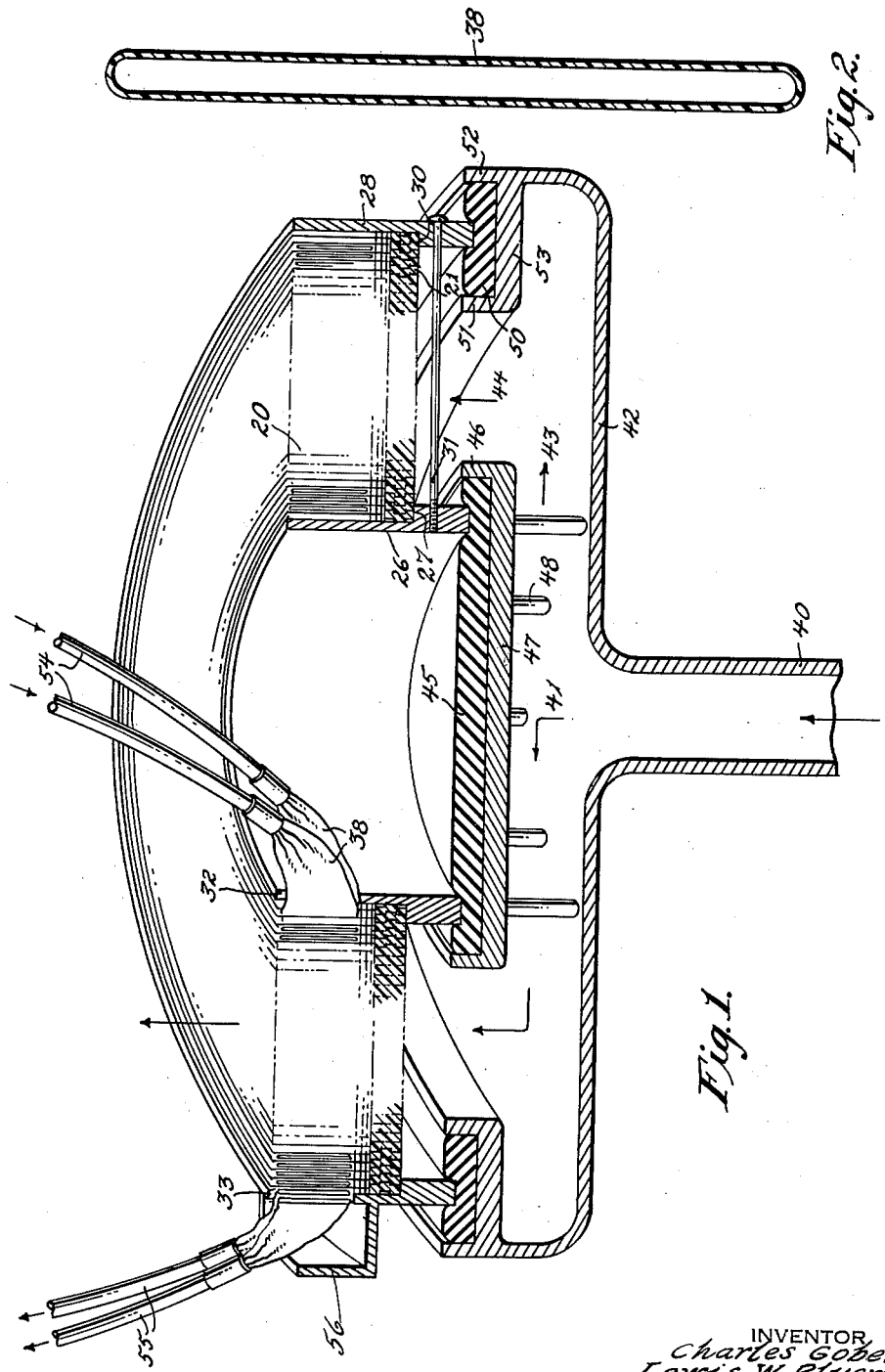

3,077,268
DIALYZER
Charles Gobel, Philadelphia, and Lewis W. Bluemle, Wynnewood, Pa., assignors to The Trustees of the University of Pennsylvania, Philadelphia, Pa., a corporation of Pennsylvania
Filed May 6, 1959, Ser. No. 811,455
2 Claims. (Cl. 210—321)

The present invention relates to dialyzers of the character which are particularly suitable for hemodialyzers, but are also useful for dialyzing filters for purification of industrial liquids and the like.

A purpose of the invention is to obtain greater efficiency in dialysis.

A further purpose is to reduce the resistance to flow through a dialyzer of both the liquid inside and the liquid outside the dialyzing membrane.

A further purpose is to reduce the cost of dialyzers, particularly hemodialyzers.

A further purpose is to increase the service life of dialyzers.

A further purpose is to obtain minimum contact between the membrane support and the membrane and conversely allow maximum contact between the membrane and the dialyzing liquid by supporting the membrane from multiple cone supports.

A further purpose is to provide more uniform distribution of dialyzing liquid.

A further purpose is to obtain turbulence in dialyzing solution flow which increases its washing tendency.

A further purpose is to obtain a relatively constant dialyzing solution flow channel despite changes in pressure across the dialyzing membrane.

A further purpose is to obtain fairly constant blood volume within the dialyzing membrane tubing despite changes in internal pressure.

A further purpose is to provide a diversity of flow paths outside a tubular dialyzing membrane.

A further purpose is to avoid localized differences in concentration of the dialyzing ingredient in the dialyzing solution.

A further purpose is to facilitate assembly of a dialyzer.

A further purpose is to facilitate cleaning and sterilizing of a dialyzer if required.

A further purpose is to avoid the danger of pleating of the dialyzing membrane.

A further purpose is to prevent the presence of stagnant dialyzing fluid.

Further purposes appear in the specification and in the claims.

In the drawings we have chosen to illustrate one only of the numerous embodiments in which the invention may appear, selecting the form shown from the standpoints of convenience in illustration, satisfactory operation and clear demonstration of the principles involved.

FIGURE 1 is an axial diagrammatic section of a dialyzer according to the invention.

FIGURE 2 is an enlarged transverse section of the tubular dialyzing membrane.

FIGURE 3 is a perspective of a separator strip employed in the present invention.

FIGURE 4 is an enlarged fragmentary side elevation of the separator strip of FIGURE 3.

FIGURE 5 is a section on the line 5—5 of FIGURE 3.

FIGURE 6 is a fragmentary axial section through the dialyzer showing the dialyzer membrane and the separator strip.

FIGURE 7 is a fragmentary diagrammatic section showing a variation.

Describing in illustration but not in limitation and referring to the drawings:

There has been extensive need in the medical field for an improved hemodialyzer which can perform the function of the kidneys in emergency, especially when the kidneys cease to function due to accident, shock, reaction from blood transfusion, infusion of distilled water intravenously, serious infection, obstretical accident, glomerulonephritis or severe urinary tract infection. The improved hemodialyzer of the invention can be used for the emergency removal of certain ingested poisons, such as salicylates, barbiturates, bromides and other dialyzable toxic substances.

While the invention is particularly directed to hemodialyzers of the character under discussion it is also useful for purification of other liquids including chemical solutions and for separation of components which have different dialyzing properties, such as purifiication of sodium hydroxide.

The invention will also be useful where a gas is being transferred into or from a liquid as where blood passes through the membrane and oxygen flows outside to oxygenate the blood (artificial lung) or where an anaesthetic is being introduced through the membrane into the blood such as cyclohexane, cyclopropane, ether or nitrous oxide.

The membrane may if desired be a barrier membrane.

The invention offers a number of distinct advantages over devices of the prior art.

One great advantage of the present invention is that it will last for a long time and can be used repeatedly and need not be thrown away after a single use.

Furthermore dialyzers in the past have not been very efficient. The present invention increases the efficiency of dialyzers. It gives larger area of contact between membrane and dialyzing fluid per unit of membrane used, since the membrane support can be reduced almost to a point.

Turbulent flow is obtained on the side of the tubular membrane, increasing the washing effect over prior art dialyzers.

The device of the present invention also provides many multiple flow paths which come in contact with the outside of the diaphragm at a point at which the blood flowing through the tubular diaphragm contains impurities in high concentration and therefore the dialyzing potential is great. This is very little likelihood that the ingredient being dialyzed will reach a high localized concentration in the solution outside the tubular membrane because the liquid outside the tubular membrane flows only a short distance across the membrane transversely before it re-enters the main solution and has its concentration equalized again.

One of the great difficulties with a widely used type of prior art dialyzer has been the high resistance to flow of blood and also to flow of dialyzing solution. As compared to this type of dialyzer, the present invention offers resistance to flow of blood which is reduced to about one-half and resistance to flow of dialyzing solution which is reduced to between 1 and 5% of that in the prior art.

One of the great advantages of the device of the present invention is the uniform distribution of dialyzing fluid. Uniform distribution reduces the tendency to form stagnant pools and thus improves dialyzing efficiency.

One of the great difficulties with prior art dialyzers has been maldistribution of the flow of dialyzing solution, particularly in devices using a screen mesh to provide both the membrane support and channels for the dialyzing solution. Furthermore, in devices of this sort, increases in blood pressure inside the membrane tubing causes distention of the membrane into the interspaces of the screen which effectively reduce the dialyzing solution channel cross section. This in turn increases the resistance to dialyzing solution flow and reduces the area of contact between the membrane and dialyzing solution.

In the device of the present invention, these difficulties are obviated since the multiple cone support maintains uniform distribution of dialyzing solution, maintains an adequate flow path for dialyzing solution despite changes in pressure across the membrane, allows minimum contact between the membrane support and the membrane and maximum contact between the membrane and the dialyzing solution, gives fairly constant blood volume in the membrane tubing despite changes in internal pressure, and promotes washing tendency of the dialyzing solution against the membrane.

The device of the present invention is very easily assembled and disassembled and once it is assembled it need not be frequently disassembled.

The device of the present invention provides as many different parallel passages for blood flow as are desired. In the present device, two plastic strips are formed into a helical coil, but three or four or more can be used if desired to provide additional parallel paths.

In accordance with the invention there is accurate control of the spacing between spacer strips in which the tubular membrane rests, since a rim on the spacer strip controls the spacing. The coil can be tightly locked without interfering with flow since there are flow passages at intervals around the rim.

The multiple cones or hobnail projections assure adequate support of the dialyzer membrane, without danger that the tubular membrane will become pleated. The tendency of the membrane to fit around the cones prevents it from shifting its position. On the other hand, there is minimum contact between the cones and the membrane.

Since various parallel paths can be provided, there is no danger that stagnant dialyzing solution will be present.

The multiple cone support of the invention may be used as a membrane support in filter-press type dialyzers if desired.

The device may be run cross-current, counter-current, or co-current as desired.

The separator strip according to the invention is preferably made of an elastomer such as polyethylene or polyvinylchloride, although any other suitable non-toxic and non-contaminating elastomer may be used. Polyethylene has the advantage of low friction on the membrane. The durometer is preferably about 60 so that the cones or hobnails will not be stiff enough to be in danger of penetrating the membrane. On the other hand the membrane is supported by the areas near the apexes of the cones or hobnails so that good flow is provided around the cones or hobnails.

The separator strip 20 in accordance with the invention has at one side, which in the assembly will be the lower edge, a rim 21 which is desirably relatively thick compared to the opposite edge or upper portion. The rim 21 desirably consists of a series of blocks 22 which at one side are separated by transverse channels 23 which permit dialyzing solution to flow into the space between the separator strip turns. On one side the rim 21 has a longitudinal groove 24 which is engaged by suitably disc-shaped projections 25 on the other side of the separator strip and from the next turn, which in the case of two separator strips will be the next separator strip.

This produces a tight interlock coil at the rim when the separator strips, preferably two side by side, are coiled in an Archimedes spiral as shown in FIGURE 1. To hold the coil together, a suitably metallic hub 26 which has a shoulder 27 supporting the rim of the innermost turns receives the inside of the coil and a collar 28 having a shoulder 30 which supports the outermost turns surrounds the coil, the hub and the collar being fastened together at suitable intervals by screws 31 as desired. These is a suitable groove in the hub 26 at 32 to permit the dialyzer membranes to enter and there is a suitable groove at 33 in the collar to permit the dialyzer membranes to leave the space between the separator strips.

Immediately adjoining the rim, the elastomer separator strip has a series of large cones or hobnails 34 on both sides which reach approximately the middle of the inter-membrane space at 35 and prevent the possibility that the dialyzer membrane could drop to touch the rim. The space around the cones or hobnails 34 thus provides for flow transversely of the separator strips. The cones or hobnails 34 are preferably separated center-to-center by a distance not exceeding twice their cone base diameters.

Beyond the cones or hobnails 34 there are a series of small cones or hobnails 36 closely spaced together and located on both sides of the separator strip. When the cone angle is 60 degrees or less, the cones or hobnails 36 preferably are separated by center-to-center distances not exceeding twice their base diameters, and most desirably they are placed so that their center-to-center distances approximate their base diameters.

The cones or hobnails 36 do not touch, but leave a groove or space 37 through which the dialyzer membrane 38 passes of tubular cross section. The dialyzer membrane will be of any suitable character, but in many cases cellophane will be satisfactory.

The form of the cones or hobnails provides support of the membrane on the apexes of the cones or hobnails but allows plenty of room for flow of dialyzing solution between the cones or hobnails and over the side surface of the membrane.

The closeness together of the cones or hobnails assures minimum volume change on the blood side (inside the membrane) in a hemodialyzer with change in pressure. While the cones or hobnails are shown as cones, it will be evident that it is unimportant whether they are cones or pyramids or some other form which provides wide bases and narrow apexes.

In the device shown particularly in FIGURE 1, the dialyzer is placed over a large sump or basin (not shown) which stores a considerable quantity of dialyzing solution and permits the dialyzing solution to run back over the top into the sump. A suitable pump (not shown) draws dialyzing solution from the sump and pumps it under a suitable pressure up pipe 40 which conveniently acts as the support for the dialyzer which rests in the sump. The dialyzing solution in the case of hemodialyzing will suitably be a multiple electrolyte solution as well known similar to blood plasma without the protein content.

Dialyzing solution enters the space 41 at the bottom of the dialyzer container 42 and flows out at 43 and upward at 44 entering the passages 23 extending transversely through the separator strips. The coil of separator strips is supported at the inside by the hub 26 which rests on a resilient gasket 45 held within flange 46 on platform 47 supported from the dialyzer by legs 48. At the outside the coil of separator strips is supported by the collar 28 which rests on resilient gasket 50 which is held between flanges 51 and 52 on rim 53 extending inwardly from the dialyzer body.

The separator strips are so arranged that two (or more) of them in the preferred embodiment side by side begin at the inside just beyond the slot 32 in the hub and the tubular dialyzer membrances enter the spiral slots formed by the separator strips. At the inside the membranes 38 are suitably connected as by taping to inlet plastic tubes 54 which in the case of a hemodialyzer flow from an artery of the body under the action of a blood pump. The blood flows through the appropriate dialyzing membranes 38 between the cone or hobnail projections 36 and at the outer end leaves through tubes 55 which re-enter the body through a vein. A guard 56 at the outside protects the membranes.

At the same time the dialyzing solution flows upward on either side around the tubular dialyzing membranes and flows over the top of the dialyzer and over the collar 28 and returns to the sump.

In operation it will be evident that once the device is assembled, whenever it is desired to start a new dialyzing campaign, it is merely necessary to remove the tubular membranes and slide other tubular membranes into place in the grooves between the separator strips from the top without disassembling. In ordinary use of a hemodialyzer it is not necessary to sterilize the separator strips and the dialyzer itself between uses on different patients.

Accordingly the dialyzer can be put into operation quite quickly.

The principles of the invention will be applicable in other cases as illustrated in FIGURE 7 where the tubular dialyzing membrane 38 has a separator 57 provided with cones or hobnails 36 on both sides extending through the interior and providing turbulence in the flow through the interior. This feature is not desirable in hemodialyzers because of the danger of abrasion and damage to blood corpuscles, but will be desirable in other dialyzer service.

In view of our invention and disclosure, variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

In view of our invention and disclosure what we claim as new and desire to secure by Letters Patent is:

1. In a dialyzer, a longitudinally extending tubular dialyzing membrane of oblong cross section having opposed flat walls and coiled into turns forming a spiral, a plastic separator of rectangular cross section longitudinally and transversely coextensive with the membrane and having opposed flat faces extending longitudinally between said turns of the tubular membrane and being radially impervious whereby said turns are separated, a plurality of cones of equal height extending out on both flat faces of said separator and contacting and supporting the flat walls of said membrane, said cones being integral with said separator, means for passing one fluid through the space inside the tubular membrane and means for passing another fluid through the space between the plastic separator and the membrane and around the cones wherein the flow may be transverse or longitudinal, the fluids cooperating to provide for dialyzing action.

2. A dialyzer of claim 1, in which the cone apex angle does not exceed 60 degrees, and the separations of the apexes do not exceed twice the diameter of the cones at their bases.

References Cited in the file of this patent

UNITED STATES PATENTS

| | | |
|---|---|---|
| 2,650,709 | Rosenak et al. | Sept. 1, 1953 |
| 2,664,395 | Marchand | Dec. 29, 1953 |
| 2,756,206 | Gobel | July 24, 1956 |
| 2,880,501 | Metz | Apr. 7, 1959 |

FOREIGN PATENTS

| | | |
|---|---|---|
| 10,523 | Austria | Jan. 26, 1903 |

OTHER REFERENCES

Kolff et al.: "Further Development of a Coil Kidney"; Journal of Laboratory and Chemical Medicine, vol. 17, No. 6; June 1956, pp. 969–977.